United States Patent
Gu et al.

(10) Patent No.: US 9,168,939 B2
(45) Date of Patent: Oct. 27, 2015

(54) BABY CARRIAGE

(71) Applicant: Goodbaby Child Products Co., Ltd, Lujia Town Kunshan, Jiangsu (CN)

(72) Inventors: Xiaocong Gu, Jiangsu (CN); Weian Qian, Jiangsu (CN)

(73) Assignee: Goodbaby Child Products Co., Ltd, Kunshan, Jiangsu ( * ) Notice: Subject to any disclaimer, the term of this patent is extended or adjusted under 35 U.S.C. 154(b) by 0 days.

(21) Appl. No.: 14/399,869

(22) PCT Filed: Nov. 20, 2012

(86) PCT No.: PCT/CN2012/084909
§ 371 (c)(1),
(2) Date: Nov. 7, 2014

(87) PCT Pub. No.: WO2013/166818
PCT Pub. Date: Nov. 14, 2013

(65) Prior Publication Data
US 2015/0151773 A1    Jun. 4, 2015

(30) Foreign Application Priority Data
May 9, 2012 (CN) .......................... 2012 1 0141583

(51) Int. Cl.
*B62B 7/06* (2006.01)
*B62B 9/20* (2006.01)

(52) U.S. Cl.
CPC .. *B62B 7/06* (2013.01); *B62B 9/203* (2013.01)

(58) Field of Classification Search
CPC .......... B62B 7/00; B62B 7/006; B62B 7/145; B62B 7/06; B62B 7/04; B62B 7/062; B62B 7/064; B62B 7/10; B62B 7/068; B62B 7/14; B62B 7/147; B62B 9/20; B62B 9/206; B62B 9/104; B62B 9/203

USPC ................. 280/650, 639, 642, 647, 648, 658, 280/47.38, 47.39, 47.4, 47.41
See application file for complete search history.

(56) References Cited

U.S. PATENT DOCUMENTS 3,873,116 A * 3/1975 Perego .......................... 280/650
4,180,276 A * 12/1979 Kassai ....................... 280/47.36
(Continued)

FOREIGN PATENT DOCUMENTS

CN        2432115        5/2001
CN      201338649       11/2009
(Continued)

*Primary Examiner* — James M Dolak
(74) *Attorney, Agent, or Firm* — Stites & Harbison PLLC; Cong Ding

(57) ABSTRACT

The invention discloses a baby carriage comprising a frame, a seat disposed on the frame, and a front wheel assembly and a rear wheel assembly arranged at the bottom of the frame. The frame comprises a push rod, a front wheel bracket with an upper portion being rotatably connected with the push rod and a lower end being provided with the front wheel assembly, a rear wheel bracket with a lower end being provided with the rear wheel assembly; and a seat rod with a front portion being connected with the front wheel bracket and a rear portion being rotatably connected with the rear wheel bracket. The seat is located above the seat rod. A sliding element is is slidably disposed on the push rod along the push rod, and the sliding element is rotatably connected with the rear wheel bracket. The push rod has a first working position and a second working position, in the first working position, an upper portion of the push rod is located above the seat at it's back side, and in the second working position, the upper portion of the push rod is located above the seat at it's front side. During the conversion of the push rod, the push rod is rotated relative to the front wheel bracket, the sliding element on the push rod is moved under the traction of the rear wheel bracket, and the rear wheel bracket is rotated relative to the seat rod under the traction of the sliding element. The baby carriage of the invention has simple configuration, and the folding of the frame will not be hindered by any parts.

4 Claims, 4 Drawing Sheets

(56) References Cited

U.S. PATENT DOCUMENTS

| | | | |
|---|---|---|---|
| 5,421,603 A * | 6/1995 | Wills et al. | 280/642 |
| 6,508,605 B1 | 1/2003 | Cheng | |
| 6,581,957 B1 * | 6/2003 | Lan | 280/642 |
| 8,210,563 B2 * | 7/2012 | Dotsey et al. | 280/647 |
| 8,215,651 B2 * | 7/2012 | Mountz et al. | 280/47.36 |
| 8,328,226 B2 * | 12/2012 | Xu-Hui et al. | 280/643 |
| 8,480,116 B2 * | 7/2013 | Li | 280/643 |
| 8,622,404 B2 * | 1/2014 | Chen et al. | 280/47.36 |
| 8,733,787 B2 * | 5/2014 | Wang | 280/658 |
| 2006/0071452 A1 | 4/2006 | Yeh | |

FOREIGN PATENT DOCUMENTS

| | | |
|---|---|---|
| CN | 102101489 | 6/2011 |
| CN | 102248961 | 11/2011 |
| JP | 200783896 | 4/2007 |

* cited by examiner

BABY CARRIAGE

CROSS REFERENCE TO RELATED APPLICATIONS

This application is a §371 National State Application of PCT/CN2012/084909 filed Nov. 20, 2012 which claims priority to CN 201210141583.0 filed May 9, 2012.

FIELD OF THE INVENTION

The present invention relates to a baby carriage.

DESCRIPTION OF THE RELATED ART

The main body of an existing baby carriage generally comprises a frame, a seat mounted on the frame and a wheel assembly arranged at the bottom of the frame, and the frame mainly includes a push rod, a front wheel bracket and a rear wheel bracket. For the convenience of use, currently there is a baby carriage with a convertible push rod.

For example, the utility model ZL 99226992.X discloses a baby carriage, the baby carriage comprises a front leg, a front wheel assembly, a rear wheel assembly and a push rod, an upper portion of the front leg is connected with a connecting member, an upper portion of the rear leg is also connected with the connecting member, and a lower portion of the push rod is detachably connected with the connecting member. Furthermore, the push rod is convertible in the front-rear direction by means of it's rotation relative to the connecting member.

SUMMARY OF THE INVENTION

An object of the invention is to provide a baby carriage which is convertible in direction.

For the foregoing purpose, the invention provides a baby carriage comprising a frame, a seat disposed on the frame, and a front wheel assembly and a rear wheel assembly arranged at the bottom of the frame. The frame comprises a push rod, a front wheel bracket with an upper portion being rotatably connected with the push rod and a lower end being provided with the front wheel assembly, a rear wheel bracket with a lower end being provided with the rear wheel assembly, and a seat rod with a front portion being connected with the front wheel bracket and a rear portion being rotatably connected with the rear wheel bracket, and the seat is disposed above the seat rod. A sliding element is disposed on the push rod, which is slidable along the push rod and rotatably connected with the rear wheel bracket. The push rod has a first working position and a second working position, the push rod can convert from the first working position to the second working position by means of it's rotation relative to the front wheel bracket, and vice versa. An upper portion of the push rod is located above the seat at it's back side when the push rod is in the first working position, and the upper portion of the push rod is located above the seat at it's front side when the push rod is in the second working position. When the carriage is pushed in a forward direction, the upper portion of the push rod is positioned above the seat at it's rear side, and when it is required to push the carriage in a reverse direction, the push rod is rotated relative to the front wheel bracket, and the sliding element on the push rod is moved under the traction of the rear wheel bracket, meanwhile, the rear wheel bracket is also rotated relative to the seat rod under the traction of the sliding element, until the push rod is rotated into the second working position such that the push rod is positioned.

Preferably, it would be best that the sliding element is located above the connection location of the push rod and the front wheel bracket, and the sliding element will slide down along the push rod during the conversion of the push rod from the first working position to the second working position.

More preferably, the sliding element is a sliding sleeve sheathed on the push rod.

Preferably, the sliding element is rotatably connected with the rear wheel bracket by a first rotation shaft, the front wheel bracket is rotatably connected with the push rod by a second rotation shaft, and the axis of the first rotation shaft and the axis of the second rotation shaft are parallel to each other.

More preferably, the seat rod is rotatably connected with the rear wheel bracket by a third rotation shaft, the axis of the third rotation shaft and the axis of the first rotation shaft are parallel to each other.

Due to the above technical solution, the present invention has the following advantages as compared with the prior art: in the invention, a baby carriage with a new conception is provided, by means of the rotation of the push rod relative to the front wheel bracket, the sliding element moves relative to the push rod as the push rod rotates and the rear wheel bracket rotates with it, so that the position of the push rod can be changed when the frame is unfolded, and thus the baby carriage is convertible. The baby carriage of the invention has simple configuration, and the folding of the frame will not be hindered by any parts.

wherein,

1. a push rod; 2. a front wheel bracket; 3. a rear wheel bracket; 4. a sliding sleeve; 5. a first rotation shaft; 6. a seat rod; 7. a backrest rod; 8. a front wheel assembly; 9. a rear wheel assembly; 10. a second rotation shaft; 11. a third rotation shaft; 12. a bottom bracing.

DESCRIPTION OF THE PREFERRED EMBODIMENTS

The baby carriage according to preferred embodiments of the present invention will be described in more detail hereinafter with reference to the accompanying drawings.

Figure 1:
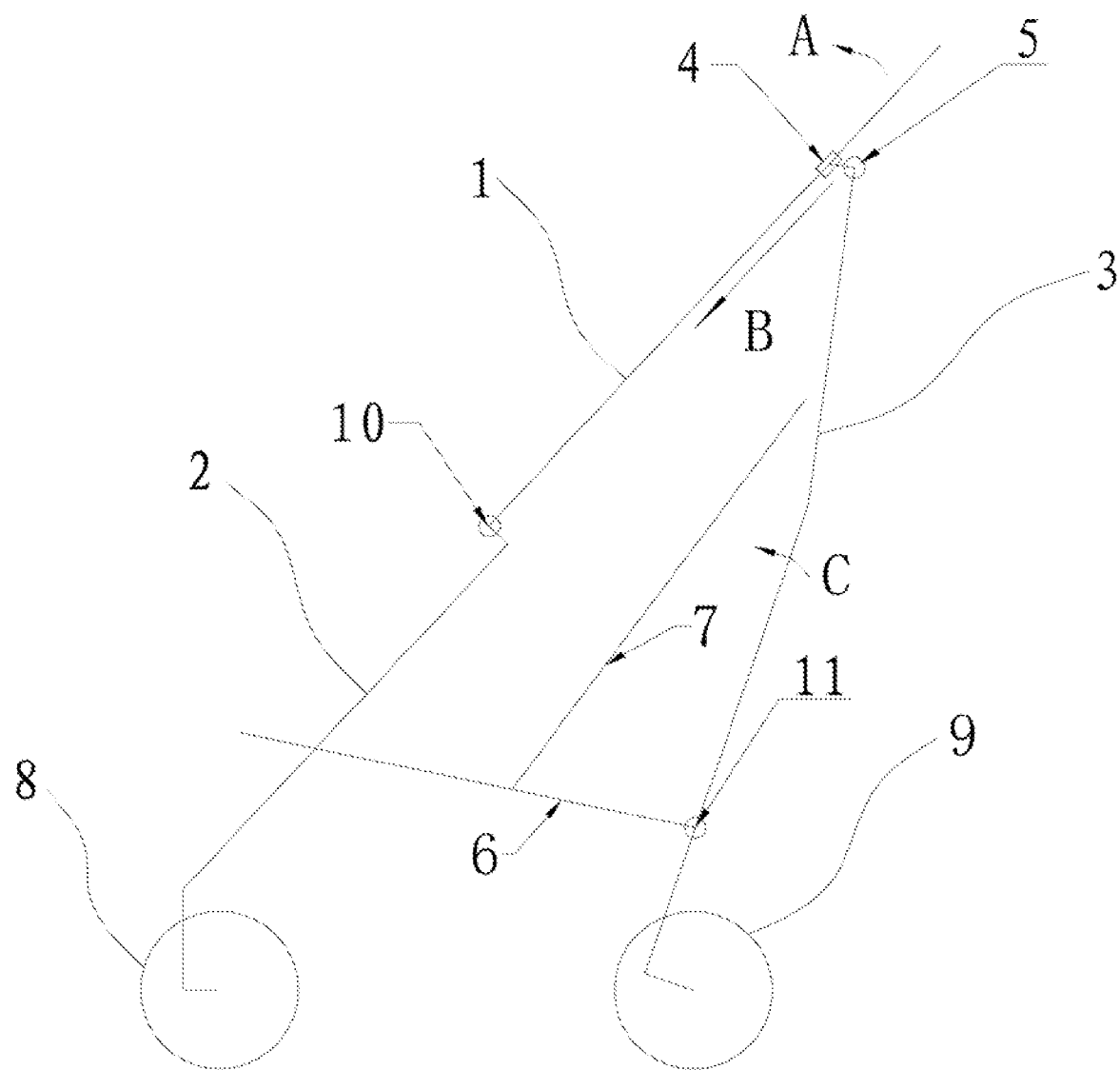
FIG. 1 is schematic drawing of a baby carriage according to an embodiment of the invention, wherein the baby carriage is in a forward state.
Figure 2:
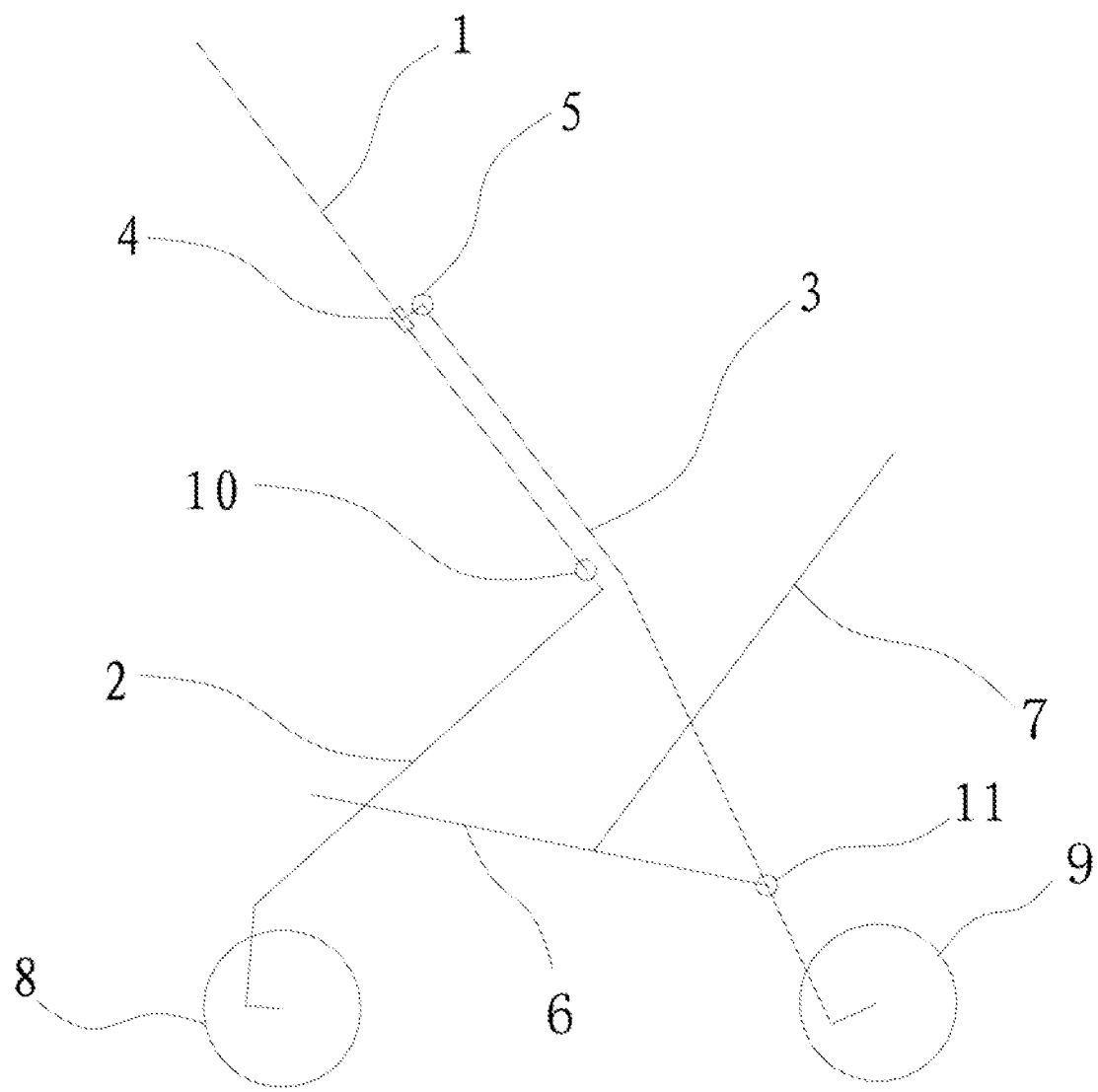
FIG. 2 is a schematic drawing of the baby carriage of FIG. 1 in a reverse state.

An embodiment 1 is as shown in FIGS. 1-2, the FIGS. 1-2 schematically illustrate the structure of a baby carriage which is foldable in single direction, this baby carriage comprises a frame, a seat disposed on the frame, a front wheel assembly 8 and a rear wheel assembly 9 arranged at the bottom of the frame. The frame comprises a push rod 1, a front wheel bracket 2 with an upper portion being rotatably connected with the push rod 1 and a lower end being provided with the front wheel assembly 8, a rear wheel bracket 3 with a lower end being provided with the rear wheel assembly 9, and a seat rod 6 with a front portion being connected with the front wheel bracket 2 and a rear portion being rotatably connected with the rear wheel bracket 3, and the seat is located above the seat rod 6. The seat is not shown in fig.s because it's configuration and mounting means are well known for a person skilled in the art.

As shown in FIGS. 1 and 2, usually a backrest rod 7 is connected with the seat rod 6, and the seat is supported by the seat rod 6 and the backrest rod 7.

The push rod 1 is enabled to be rotated relative to the front wheel bracket 2, such that the push rod 1 has a first working position and a second working position and can be converted between the two positions. The first working position of the push rod is as shown in FIG. 1, the upper portion of the push rod is located above the seat at it's back side. The second working position of the push rod is as shown in FIG. 2, the upper portion of the push rod is located above the seat at it's front side. The terms "front" and "rear" herein and throughout the invention are defined according to usual habits of a user, and the left side in the FIG. 1 refers to a front side, and the right side refers to a rear side.

A sliding element is slidably disposed on the push rod along the push rod, and the sliding element is rotatably connected with the rear wheel bracket 3. In the preferred embodiment shown in FIGS. 1 and 2, the sliding element is a sliding sleeve 4 which is sheathed on the push rod 1, and the sliding sleeve 4 is located above the connection location of the push rod 1 and the front wheel bracket 2.

Ideally, the sliding sleeve 4 is rotatably connected with the rear wheel bracket 3 by a first rotation shaft 5, the front wheel bracket 2 is rotatably connected with the push rod 1 by a second rotation shaft 10, and the axis of the first rotation shaft 5 and the axis of the second rotation shaft 10 are parallel to each other.

Preferably, the seat rod 6 is rotatably connected with the rear wheel bracket 3 by a third rotation shaft 11, and the axis of the third rotation shaft 11 and the axis of the first rotation shaft 5 are parallel to each other.

Generally the push rod 1 is in the first working position shown in FIG. 1, and the push rod 1 can be converted into the second working position shown in FIG. 2, the course of conversion is as follows: the push rod 1 is rotated relative to the front wheel bracket 2 along the direction shown by arrow A of the FIG. 1, and under the driving of the sliding sleeve 4, the rear wheel bracket 3 is rotated relative to the seat rod 6 along the direction shown by arrow C of the FIG. 1, meanwhile, the sliding sleeve 4 will be rotated relative to the push rod 1 along the direction shown by arrow B of the FIG. 1. As shown in FIG. 2, the rear wheel bracket 3 is rotated into a proper position after the conversion of the push rod 1, such that the balance of the baby carriage can be maintained in the reverse state, and also the baby carriage has a nice appearance.

For the convenience of the folding of the baby carriage, the front portion of the seat rod 6 also may be rotatably connected with the front wheel bracket 2. However, during the conversion of the push rod 1, it would be best that the seat rod 6 and the front wheel bracket 2 shall be relatively motionless.

In order to achieve a frame with stable structure in unfolding position (regardless of the state of push rod), preferably the frame is locked by a locking mechanism, the locking mechanism may be associated with the connection location of the sliding sleeve 4 or other rods. The configuration or operation means of various locking mechanisms have already been well known by a person skilled in the art, thus, the locking mechanism will not be described in more detail in connection with accompanying drawings.

Figure 3:
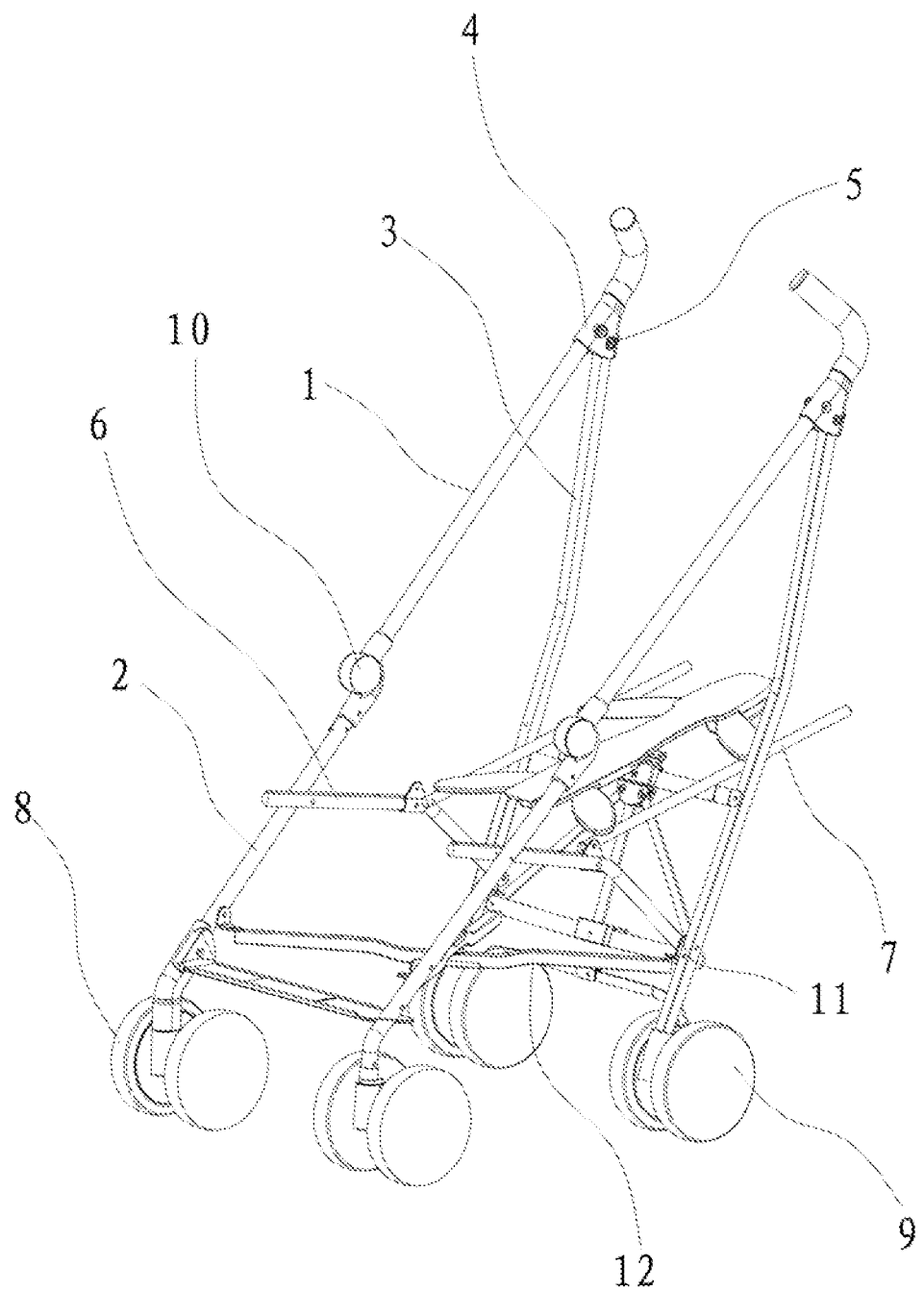
FIG. 3 is schematic drawing of a baby carriage according to another embodiment of the invention, wherein the baby carriage is in a forward state.
Figure 4:
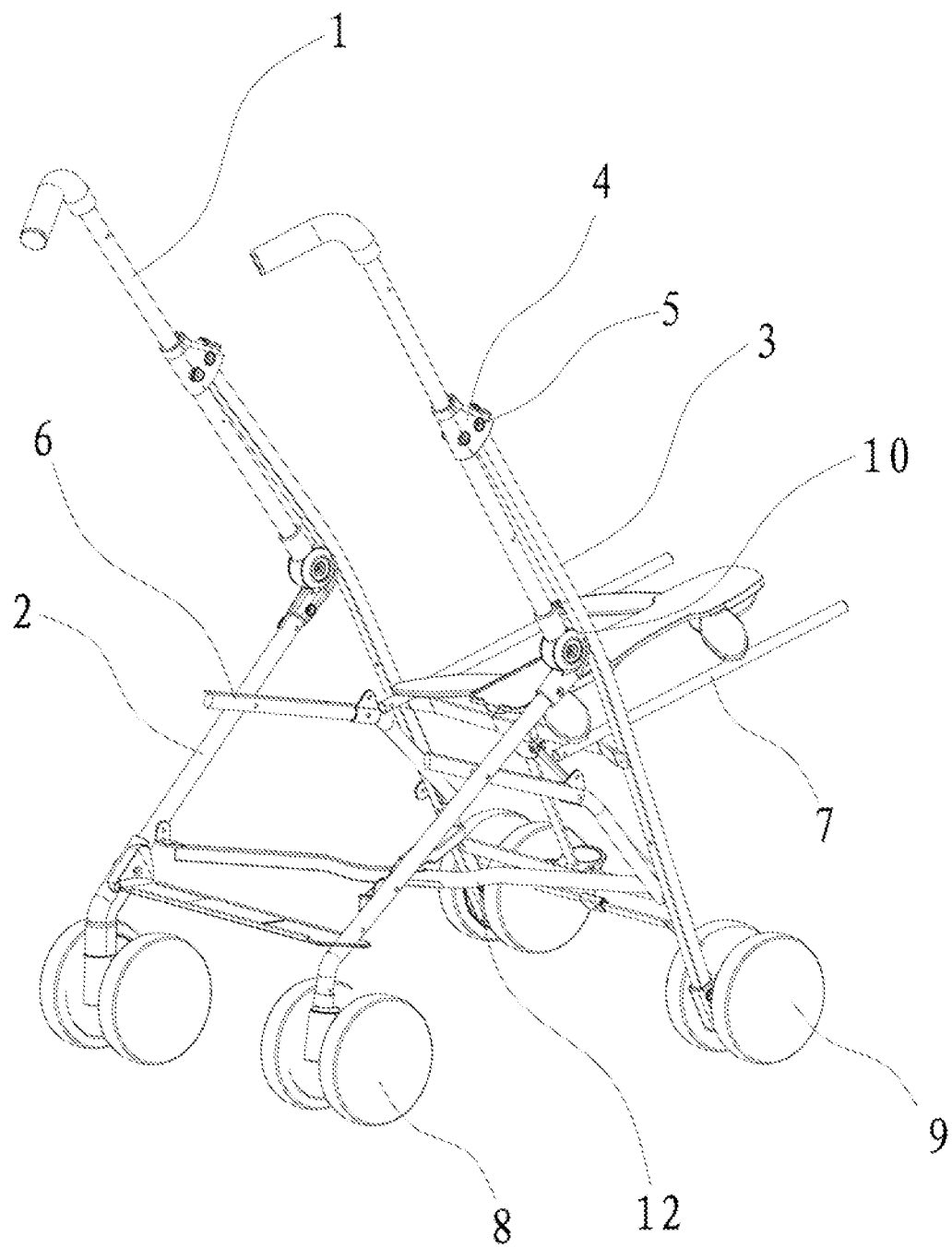
FIG. 4 is a schematic drawing of the baby carriage of FIG. 3 in a reverse state.

FIGS. 3-4 illustrate an embodiment 2 according to the invention, the difference of the embodiment 2 from the embodiment 1 consists in: the baby carriage is bidirectionally folding. A X-shaped bottom bracing 12 is disposed at the bottom of the frame, and the bottom bracing 12 is consisted of two connecting rods which intersect and rotatably connect with each other at the intersection joint, two ends of each connecting rod respectively are correspondingly connected to the front wheel bracket 2 and the rear wheel bracket 3 in opposite sides. The bottom bracing 12 will draw together as the baby carriage is folded. Furthermore, for the conversion means of the push rod 1 of this embodiment, a user may directly refer to the conversion means described in embodiment 1.

The specific embodiments of the invention are illustrated as above in connection with accompanying drawings, and it is obvious that many modifications can be made to the prior art without departing from the scope and spirit of the invention. Furthermore, in the filed of the invention, various variations can be made within the scope of technical points of the invention if the common knowledge is grasped.

What is claimed is:

1. A baby carriage, comprising a frame, a seat disposed on the frame, and a front wheel assembly and a rear wheel assembly arranged at the bottom of the frame, the frame comprising a push rod, a front wheel bracket with an upper portion being rotatably connected with the push rod and a lower end being provided with the front wheel assembly, a rear wheel bracket with a lower end being provided with the rear wheel assembly, and a seat rod with a front portion being connected with the front wheel bracket and a rear portion being rotatably connected with the rear wheel bracket, the seat being disposed on the seat rod;
   wherein a sliding element is disposed on the push rod, which is slidable along the push rod and rotatably connected with the rear wheel bracket, the push rod having a first working position and
   a second working position between which the push rod can convert by means of its rotation relative to the front wheel bracket, an upper portion of the push rod is located above the seat at
   its back side when the push rod is in the first working position, and the upper portion of the push rod is located above the seat at its front side when the push rod is in the second working
   position, and wherein the sliding element is rotatably connected with the rear wheel bracket by a first rotation shaft, the front wheel bracket is rotatably connected with the push rod by a second rotation shaft, and the axis of the first rotation shaft and the axis of the second rotation shaft being parallel to each other.

2. The baby carriage as claimed in claim 1, wherein the sliding element is located above the connection location of the push rod and the front wheel bracket.

3. The baby carriage as claimed in claim 1, wherein the sliding element is a sliding sleeve sheathed on the push rod.

4. The baby carriage as claimed in claim 1, wherein the seat rod is rotatably connected with the rear wheel bracket by a third rotation shaft, the axis of the third rotation shaft and the axis of the first rotation shaft being parallel to each other.

* * * * *